United States Patent [19]

Kobayashi et al.

[11] 3,942,495
[45] Mar. 9, 1976

[54] ARRANGEMENT FOR HEATING THE SUCTION GASES OF AN INTERNAL COMBUSTION ENGINE

[75] Inventors: Nobuyuki Kobayashi; Ken Tanoue; Masahiko Nakada, all of Toyota, Japan

[73] Assignee: Toyota Jidosha Kogyo Kabushiki Kaisha, Japan

[22] Filed: Feb. 27, 1974

[21] Appl. No.: 446,218

[30] Foreign Application Priority Data
Nov. 20, 1973 Japan.............................. 48-129675

[52] U.S. Cl...................... 123/122 AC; 123/122 H
[51] Int. Cl.²..................................... F02M 31/00
[58] Field of Search.... 123/122 H, 122 AC, 122 AB

[56] References Cited
UNITED STATES PATENTS

| | | | |
|---|---|---|---|
| 1,676,955 | 7/1928 | Kemp............................ | 123/122 AC |
| 2,196,330 | 4/1940 | Chandler........................ | 123/122 H |
| 2,437,724 | 3/1948 | Brown............................ | 123/122 H |
| 3,831,568 | 8/1974 | Heimburg....................... | 123/122 H |

*Primary Examiner*—Charles J. Myhre
*Assistant Examiner*—R. H. Lazarus
*Attorney, Agent, or Firm*—Kenyon & Kenyon

[57] ABSTRACT

An arrangement is disclosed for heating the suction gases of an internal combustion engine by utilizing the exhaust gases from the engine in order to promote the vaporization of the fuel contained within the suction gases while the engine is still in a cool state. In the arrangement, the high temperature exhaust gases from the engine are routed, by the control of a control valve rotatable between two positions in the exhaust manifold, around fins formed on the exterior wall of the bottom floor of the intake manifold for receiving the heat of the exhaust gases, and a covering is provided for enclosing the fins in a closed chamber. The covering, made of a heat resistant metal plate, is provided with inlet and outlet ports so as to introduce the exhaust gases into the chamber and drain the exhaust gases from the chamber. The covering is further provided with a vertical wall or walls which descend therefrom into the exhaust manifold so that the control valve comes into close contact with walls when the control valve is rotated to the two positions, respectively, in the exhaust manifold.

3 Claims, 6 Drawing Figures

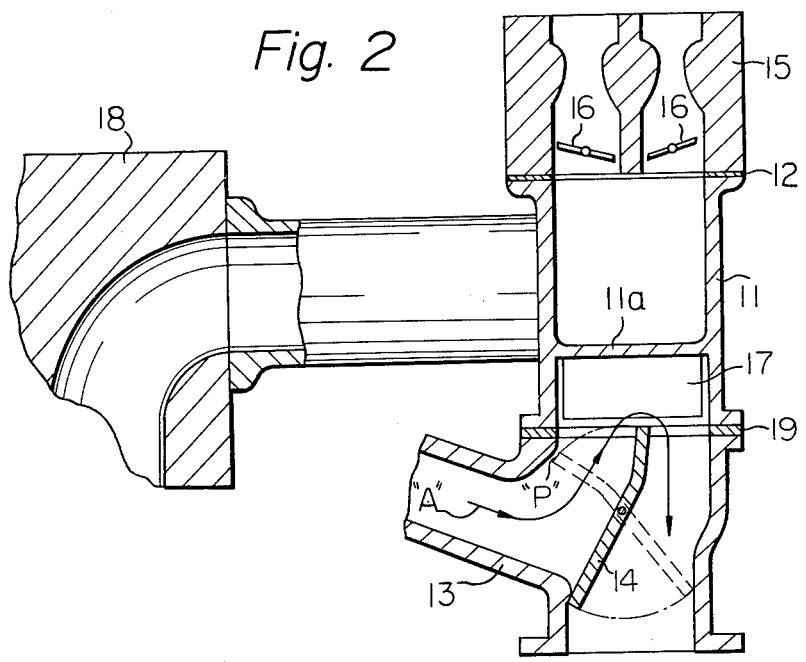
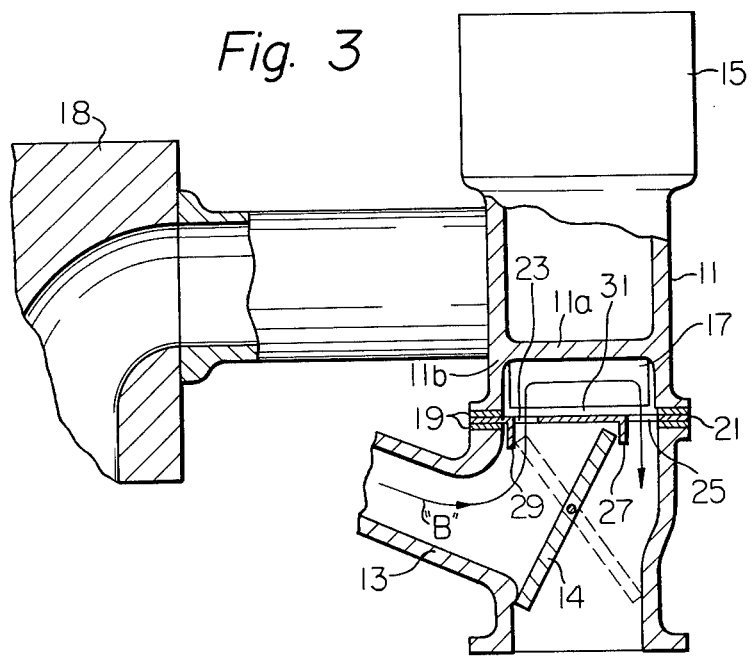

ARRANGEMENT FOR HEATING THE SUCTION GASES OF AN INTERNAL COMBUSTION ENGINE

DESCRIPTION OF THE INVENTION

The present invention relates to an internal combustion engine with an arrangement for heating the suction gases, in which the intake manifold is heated by the high temperature exhaust gases so that vaporization of the liquid fuel contained within the suction gases flowing in the intake manifold is promoted, and after the engine apparatus is once warmed up, the high temperature exhaust gases are prevented from being routed around the intake manifold.

Generally, in the starting period of an internal combustion engine, and especially in the starting period of a completely cooled engine or of an engine in the cold season, not only the engine itself but also the suction system for the engine are cold. Therefore, the fuel cannot be completely vaporized, and as a result the engine is not supplied an appropriate air-fuel mixture. Also, such incomplete vaporization of the fuel causes unequal disitribution of the air-fuel mixture to each cylinder of the engine. Thus, in such engine, incomplete combustion or failure of combustion often takes place until the engine together with it suction system is warmed up and, accordingly, unsatisfactory operation of the engine results. In order to overcome such unsatisfactory operation of the engine, a rich air-fuel mixture has conventionally been employed when starting the engine by utilizing the known choke effect. As a result, numerous harmful constituents remain in the exhaust gases from the conventional engine.

In order to eliminate the foregoing drawbacks, it has subsequently been proposed to heat the suction system of an engine so as to promote vaporization of the fuel within the suction gases, in the starting period or until the engine warms up. That is, two arrangements for heating the suction systems have been proposed. In the first arrangement, water used for cooling the engine is routed adjacent to the intake manifold so that heat absorbed from the engine by the cooling water is employed for heating the intake manifold. In the second arrangement, the exhaust manifold is disposed adjacent to the intake manifold so that the exhaust gases having high temperature and flowing in the exhaust manifold are employed for heating the intake manifold, thereby heating the fuel contained in the suction gases flowing in the intake manifold.

However, in the above-mentioned first arrangement, the highest temperature of the cooling water due to absorbing heat from the engine is never too far above one hundred degrees centigrade if the engine is working properly and, also the temperature rises at a very slow rate. From these facts, the first arrangement employing the cooling water lacks ability to attain immediate heating of the fuel in the intake manifold. Consequently, the second arrangement employing the exhaust gases which have extremely high temperature as soon as the engine starts, is conventionally used.

However, in an internal combustion engine with a conventionally used arrangement for the heating of the suction gases, shortcomings are encountered, which will be explained later with reference to FIGS. 1 and 2.

Therefore, an object of the present invention is to obviate the shortcomings of the conventionally used arrangement for heating the suction gases of an internal combustion engine.

Another object of the present invention is to provide an arrangement for heating the suction gases of an internal combustion engine as set forth in the above first mentioned object of the present invention, on the basis of a simple and low cost fabrication method.

In accordance with the present invention, an arrangement for heating the suction gases of an internal combustion engine is provided, which includes an intake manifold having the fins provided on an exterior wall of a bottom floor of the intake manifold; an exhaust manifold disposed underneath the intake manifold; a control valve disposed to be rotatable between a first and second position in the exhaust manifold thereby defining a first passageway for routing the high temperature exhaust gases exhausted from the engine around the fins of the intake manifold so as to heat the suction gases within said intake manifold and a second passageway for preventing the exhaust gases from reaching said fins after said exhaust gases have been exhausted from the engine, and; covering means for enclosing said fins of said intake manifold in a closed chamber defined between said covering means and said exterior wall of said intake manifold, said covering means being provided with an inlet port for introducing said exhaust gases into said chamber, an outlet port for draining said exhaust gases from said chamber and a wall which vertically descends therefrom into said exhaust manifold so that said control valve comes in close contact with said vertical wall when said control valve is rotated to the first position where said exhaust gases flow in the first passageway. Said arrangement for heating the suction gases being characterized in that said vertical wall is formed by folding a part or all of the material plate which has occupied said outlet port.

In accordance with the present invention, said arrangement for heating the suction gases is further characterized in that it is provided with another wall which vertically descends from said covering means into said exhaust manifold so that said control valve comes into close contact with said other vertical wall when said control valve is rotated to the second position where said exhaust flow in said second passageway, said other vertical wall being also formed by folding a part or all of the material plate which has occupied said inlet port.

The present invention will become apparent from the ensuing description and the accompanying drawings which illustrate both a conventional arrangement for heating the suction gases of an internal combustion engine and, by way of examples, embodiments of the arrangement for heating of the suction gases of an internal combustion engine of the present invention.

In the drawings:

FIG. 2 is a cross sectional view taken along the line II—II of FIG. 1;

FIG. 3 is a similar cross sectional view to FIG. 2 with an embodiment of an arrangement for heating the suction gases of an internal combustion engine according to the present invention;

Figure 1:
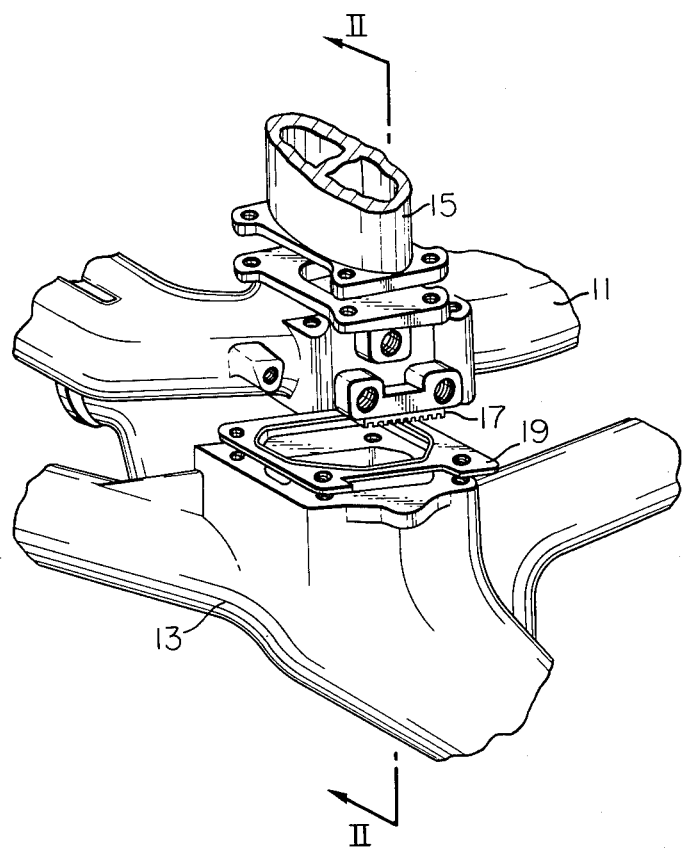
FIG. 1 is a perspective and disassembled view in part, of intake and exhaust manifolds of an internal combustion engine, in which manifolds, a known arrangement for heating the suction gases is provided.

In FIG. 1, numerals 11 and 13 represent intake and exhaust manifolds, respectively. The upper end of the intake manifold 11 is connectable with a carburetor 15 and the branching pipes of the intake manifold 11 are connectable with each cylinder of an internal combustion engine. The suction gases for the internal combustion engine are sucked in the intake manifold 11 from the carburetor 15. The branching pipes of the exhaust manifold 13 and also connectable with the internal combustion engine so that the exhaust gases exhausted from the engine are collected into the exhaust manifold 13. The collected exhaust gases can be routed, by the control of a later described valve, around heat receivable fins 17 which are formed on the exterior wall of the intake manifold 11. Thus, the exhaust gases having extremely high temperature heat the fins 17 and, as a result, the heat is transmitted to the suction gases in the intake manifold thereby promoting the vaporization of the fuel within the suction gases. The numeral 19 designates a sealing gasket disposed between the intake manifold 11 and the exhaust manifold 13.

Referring to FIG. 2 which is a vertical cross sectional view take along the line II—II of FIG. 1, a bottom floor part 11a of the intake manifold 11, which is disposed underneath the carburetor 15, is provided with a number of plate-shaped fins 17 formed on the exterior bottom wall of the floor 11a. The intake manifold 11 is connected with the carburetor 15 via a gasket 12 for sealing the connection between the intake manifold 11 and the carburetor 15. In this carburetor, well known throttle valves 16 are provided. The intake manifold 11 is communicated with cylinder head 18 of the engine by way of the branching pipes, as described in the foregoing. To the lower flange of the bottom floor part 11a of the intake manifold 11, the exhaust manifold 13 is connected via sealing gasket 19. In the interior of the exhaust manifold 13, a plate-shaped control valve 14 for controlling the direction of the flow of the exhaust gases is provided so that it can be rotated by a suitable exterior mechanism so as to take the two position shown by the solid and dotted lines. That is, before the engine and the intake manifold 11 warm up, the control valve 14 takes the position shown by the solid line and controls the flow of the exhaust gases coming from the engine so that the exhaust gases having high temperature are routed along the shown line A so as to contact the fins 17. As a result, the heat of the exhaust gases is transmitted to the fins 17, which are formed so as to have large surfaces to receive the heat and subsequently, the fuel flowing in the intake manifold 11 is heated by the heat transmitted to the fins 17 so that vaporization of the liquid fuel is promoted. When the engine and the intake manifold 11 warm up, the control valve 14 is rotated to the position shown by the dotted line so that it prevents the flow of the high temperature exhaust gases exhausted by the engine from reaching the heat receivable fins 17. As a result, the intake manifold can be prevented form overheating which decreases the density of the air within the intake manifold 11 and which consequently, decreases the amount of the air sucked in the intake manifold 11 thereby causing a poor combustion in the engine.

However, in this arrangement of FIG. 2, even if the control valve 14 is kept in the position shown by the solid line, the exhaust gases tend to stream along the line shown by the arrow A in FIG. 2 so as to contact only the central part of the fins 17. That is to say, at the opposite ends of each fin 17, direct contact of the fin 17 and the exhaust gases becomes very poor and, therefore, heat transmission efficiency is very poor. Thus, the plate-shaped fins 17 provided for the purpose of receiving the heat cannot efficiently attain their purpose. Therefore, in the end, a considerable amount of time is required for warming up the engine apparatus including the suction system. Further, in the arrangement of FIG. 2, when the control valve 14 is rotated to the position shown by the dotted line after the warming up of the engine and the intake manifold 11, part of the exhaust gases pass through a gap P, which is left between the interior wall of the exhaust manifold 13 and the valve 14 in order to mitigate difficulties in the mechanical design of the arrangement, and the exhaust gases passing the gap "P" reach the fins 17. Consequently, the intake manifold 11 is overheated through the fins 17 and as a result, the aforementioned decrease of the suction air takes place. Thus, the reduction of the power of the engine as well as damage and decrease of life of the intake manifold 11 are encountered.

In accordance with the arrangement of the present invention, before the warming up of the engine apparatus including the suction system, the flow of the high temperature exhaust gases is controlled so that the exhaust gases are directed equally over the entire surface of each fin of the intake manifold whereby the heat of the exhaust gases is sufficiently transmitted to the fuel streaming in the intake manifold in order to promote vaporization of the fuel and to shorten the time required for warming up the engine and the suction system. Also, in accordance with the arrangement of the present invention, after the warming up of the engine apparatus including the suction system, the high temperature exhaust gases are positively prevented from reaching the fins in order to avoid overheating of the intake manifold.

The present invention will now be explained with reference to FIG. 3 through FIG. 6. It should be noted that the same parts or elements as those of the prior art of FIGS. 1 and 2 are designated by the same reference numerals.

FIG. 3 is a cross sectional view of an embodiment of an arrangement for heating the suction gases according to the present invention.

In the arrangement, the air-fuel mixture produced in carburetor 15 is sucked into intake manifold 11 as suction gases and subsequently distributed to each cylinder of the engine. The bottom floor part 11a of the intake manifold 11 is provided with a number of plate-shaped and juxtaposed fins 17 formed as one part with the exterior wall of the floor part 11a. To the lower end of the intake manifold 11, the exhaust manifold 13 is connected via sealing gaskets 19 so as to hold a fin covering 21 interposed between the intake and exhaust manifolds. In the exhaust manifold 13, a control valve 14 is mounted so as to be rotated by an appropriate operating mechanism (not shown). This operating mechanism of the control valve 14 is arranged to be actuated in response to a signal produced through detection of the temperature of, e.g., the engine or the intake manifold, by which temperature it can be detected whether the engine apparatus warms up or not. As will be understood from FIG. 3, the under part of the fins 17 is covered with the fin covering 21. Therefore, the fins 17 are enclosed in a closed chamber 31 which is defined by the fin covering 21, the bottom floor 11a and the side walls 11b of the intake manifold 11. The covering 21 is provided with an inlet port 23 positioned at the upstream end with respect to the flowing direction of the exhaust gases (flowing direction is shown by an arrow B in FIG. 3). This inlet port 23 allows the high temperature exhaust gases to pass therethrough and to enter into the chamber 31 so as to contact the fins 17 in the chamber 31, when the control valve 14 is rotated to the position shown by the solid-line in FIG. 3. In order to drain the exhaust gases from the chamber 31, the covering 21 is also provided with an outlet port 25 positioned at the downstream end with respect to the flowing direction of the exhaust gases. As described above, since the inlet port 23 and the outlet port 25 are disposed at opposite ends of the covering 21 with respect to the general flowing direction of the exhaust gases, and at the bottom of the chamber 31, it should be appreciated that the high temperature exhaust gases coming from an engine via the branching pipes of the exhaust manifold 13 are routed controlling the control valve 14, into the chamber 31, and the heat of the exhaust gases can be sufficiently transmitted to the entire surface of every fin 17 while the exhaust gases move in the chamber 31. The exhaust gases which have finished the transmission of the heat thereof to the fins 17, come out of the chamber 31 through the outlet port 25, and are released into the exhaust pipe (not shown) connected to the exhaust manifold 13. It should be understood that when the control valve 14 is brought into a closed position, as shown in FIG. 3 by a solid line, the exhaust gases coming from an engine are prevented from directly proceeding in the above-mentioned exhaust pipe. In the embodiment of FIG. 3, the covering 21 is also provided with vertical walls 27 and 29 formed on the surface thereof which faces the exhaust manifold 13 so as to descend from the covering 21 into the exhaust manifold 13. The two vertical walls 27 and 29 are arranged so that the control valve 14 rotating in the exhaust manifold 13 contacts them, respectively, when the valve 14 is moved to the two positions as shown by the solid and dotted lines in FIG. 3. Therefore, when the control valve 14 is rotated to the solid line position so as to lead the flow of the exhaust gases into the chamber 31 before the engine apparatus warms up, the control valve 14 closely contacts the vertical wall 27 and as a result, no gap through which the exhaust gases directly flow into the exhaust pipe is left between the surface of the covering 21 and the top end of the control valve 14, so that leakage of the high temperature exhaust gases is completely prevented. On the other hand, when the control valve 14 is rotated to the dotted line position so as to directly lead the flow of the exhaust gases from an engine into the aforementioned exhaust pipe and so as to prevent the flow from being routed into the chamber 31 after the warming up of the engine apparatus, the control valve 14 closely contacts the vertical wall 29 and, as a result, the gap "P" which has conveniently been left between the interior wall of the exhaust manifold 13 and the valve 14, is completely eliminated. This fact assures that no exhaust gases are routed in the chamber 31 after the warming up of the engine apparatus. Therefore, the overheating of the intake manifold 11 does not take place after the warming up of the engine apparatus according to the provision of vertical wall 29. Of course, it will be understood that when the control valve 14 contacts the vertical wall 27 before the warming up of the engine apparatus, the high temperature gases are introduced with certainty into the chamber 31, so that the heat transmission efficiency to the intake manifold 11 is definitely heightened, and the time required for warming up the engine apparatus can be shortened.

Figure 4:
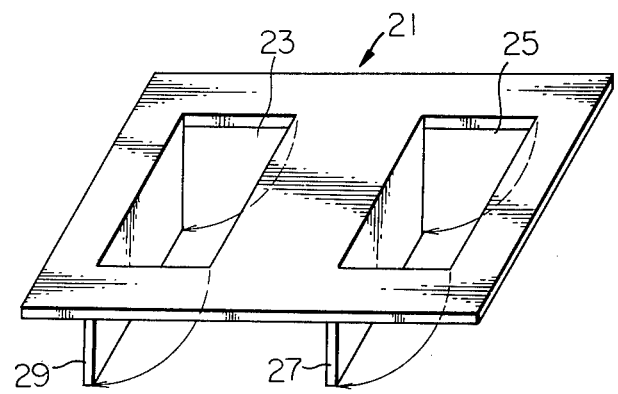
FIG. 4 is a perspective view of the fin covering used in the arrangement of FIG. 3.

FIG. 4 is a perspective view of an embodiment of the covering 21 disposed between the intake and exhaust manifold 11 and 13 of FIG. 3, and this embodiment of the covering 21 is made of heat resistant metal plate. It will be understood that this embodiment of FIG. 4 is provided with the inlet port 23, the outlet port 25, and the vertical walls 27 and 29. It should here be noted that the inlet and outlet ports 23 and 25 are formed by downwardly folding two parts of a plain metal material plate and, also, that the vertical walls 27 and 29 are formed by a part or all of the downwardly folded metal plate parts which have occupied the respective ports 23 and 25. From this fact, it will be understood that the embodiment of the fin covering 21 as shown in FIG. 4 is easily produced by merely applying cutting and bending work to a heat resistant metal plate, such as a steel plate having an appropriate thickness. It will also be understood that by interposing a thusly produced fin covering 21 together with sealing gaskets 19 between the conventionally used intake and exhaust manifolds 11 and 13, the arrangement for heating the suction gases of an internal combustion engine of the present invention as shown in FIG. 3 is completed. Therefore, increase of the working steps and the cost in production of the arrangement of the present invention, compared with the conventional arrangement, can be quite small. Further, it should be understood that although the fin covering 21 illustrated in FIG. 4 is the most preferred embodiment from the points of view of easy production and low production cost, modification of the entire shape of the fin covering 21, such as providing a slight warped shape for the covering 21, can, of course, be effected if such modification is necessary for satisfying the design condition of the arrangement of the present invention.

Figure 5:
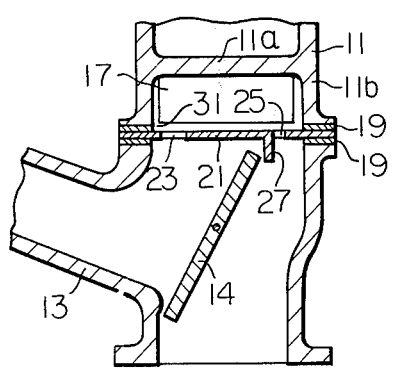
FIGS. 5 and 6 are similar and partial cross sectional views taken on the same sectional line as FIG. 3, with respect to the other embodiments of the arrangements according to the present invention.
Figure 6:
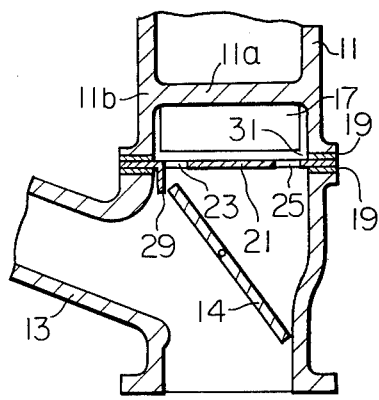

FIGS. 5 and 6 respectively show the other embodiments of the arrangement for heating the suction gases of an internal combustion engine according to the present invention, in which FIG. 5 shows the case where the fin covering 21 has only the vertical wall 27 and, on the other hand, FIG. 6 shows the case where the fin covering 21 has only the vertical wall 29.

From the foregoing, it will be fully understood that according to the present invention, diverse advantages such as reduction of harmful constituents in the exhaust gases, increase of power of an internal combustion engine, and a guarantee of long life of an intake manifold are obtained. Further, it should be appreciated that the arrangement of the present invention can be provided without any serious increase in the production steps and cost, since many of the same elements as used in the conventional arrangement for heating the suction gases of an internal combustion engine, are employed, and since the only increases in the production operation are the cutting and bending of a metal plate.

What is claimed is:

1. A heater for incoming fuel-air mixture to an internal combustion engine of the type that includes an intake manifold for said mixture having a bottom floor area; a plurality of heat conducting fins extending downward from the exterior wall of the intake manifold in the bottom floor area; an exhaust manifold disposed underneath the intake manifold adjacent to the finned area for conveying hot combustion products from the engine; a circumscribing wall surrounding the finned area and having a flanged lower face for mating engagement with a flanged opening through the wall of the exhaust manifold underneath the finned area; a partition clamped between the flanged faces of the circumscribing wall and the opening in the wall of the exhaust manifold for enclosing the fins in a chamber defined by the partition, the circumscribing wall, and the exterior wall of the intake manifold, the partition having an inlet port adjacent to one side of the circumscribing wall for introducing the combustion products into the chamber and an outlet port spaced from the inlet port adjacent to the opposite side of the circumscribing wall for exhausting the combustion products from the chamber; a substantially vertical wall extending downward from the flanged opening into the exhaust manifold; and a butterfly type control valve mounted in the exhaust manifold in the way of the opening for rotation about a horizontal axis parallel to the wall between a first position and a second position, the valve when in the first position deflecting the flow of hot combustion gases through the inlet port to contact the fins for heating the intake gases and for returnig the combustion products to the exhaust manifold through the outlet port, the valve when in the second position substantially blocking the opening through the wall of the exhaust manifold to prevent the combustion gases from contacting the fins, and the valve coming into close contact with the wall when the valve is in one of said first and second positions for preventing leakage of the combustion products around the valve when the valve is in said position, wherein the improvement comprises:

said partition being a flat plate and the vertical wall being formed integrally therewith of bent down plate material that originally occupied the area of one of said inlet and outlet ports.

2. The heater of claim 1 wherein the vertical wall comprises plate material bent down from the area of the outlet port to closely contact the valve when the valve is in the first position so that substantially all the combustion gases will flow through the finned chamber.

3. The heater of claim 2 comprising a second substantially vertical wall formed of plate material bent down from the area of the inlet port to closely contact the valve when the valve is in the second position so that substantially none of the combustion gases will enter the finned chamber.

* * * * *